United States Patent

Ishikawa et al.

[11] Patent Number: 5,189,786
[45] Date of Patent: Mar. 2, 1993

[54] ELECTRICAL CABLE STRIPPING METHOD AND ELECTRICAL CABLE LOOSENING DEVICE

[75] Inventors: Suminori Ishikawa; Norihiko Hashimoto, both of Yokkaichi, Japan

[73] Assignee: Sumitomo Wiring Systems, Ltd., Mie, Japan

[21] Appl. No.: 789,607

[22] Filed: Nov. 8, 1991

[30] Foreign Application Priority Data

Nov. 13, 1990 [JP] Japan ................................ 2-308241

[51] Int. Cl.⁵ ............................................. H01R 43/00
[52] U.S. Cl. ........................................ 29/825; 29/283; 29/564.4; 81/9.51
[58] Field of Search .............. 29/825, 874, 867, 283, 29/564.4; 72/420, 459, 460; 81/9.51

[56] References Cited

U.S. PATENT DOCUMENTS

| | | | |
|---|---|---|---|
| 1,402,687 | 1/1922 | Travenski | 72/460 |
| 1,727,322 | 9/1929 | Baird | 72/420 |
| 3,621,560 | 11/1971 | Le Bright | 81/9.51 |
| 3,780,928 | 12/1973 | Shirn | 228/13 |
| 4,572,250 | 2/1986 | Maben | 140/105 |
| 4,682,489 | 7/1987 | Bauerle et al. | 72/460 |

FOREIGN PATENT DOCUMENTS 2502858 10/1982 France .

Primary Examiner—P. W. Echols
Attorney, Agent, or Firm—Sughrue, Mion, Zinn, Macpeak & Seas

[57] ABSTRACT

An electrical cable loosening device, for loosening an electric cable having a conductor wire covered by an insulating material, has a clamping unit, a stop unit, and a pounding unit. The clamping unit clamps the electrical cable. The pounding unit pounds and bends the cable end portion against the stop unit. Thus, the insulating material separates from the conductor wire at the end portion to facilitate the stripping of the insulating material.

2 Claims, 3 Drawing Sheets

ELECTRICAL CABLE STRIPPING METHOD AND ELECTRICAL CABLE LOOSENING DEVICE

BACKGROUND OF THE INVENTION

1. Field of the Invention

The present invention relates to a stripping method for automotive resistance cable and other similar type of electrical cables, and to an electrical cable loosening device used for said stripping operation.

2. Description of the Prior Art

As shown in FIG. 2, a shielded cable P for use in automobiles has a tension member 1 made of an aramid or other polymer fiber, a core 2 formed around the tension member 1, a resistance wire 3 as a conductor wound in a spiral pattern around the core 2, an insulator 4 provided around the resistance wire 3, and a sheath 5 provided around the insulator 4.

In FIG. 3, the cable stripping operation of the cable P is schematically shown. To strip the end of the cable P, the sheath 5 and the insulator 4 are cut to have a cross section of circles by a stripping knife A, after which the stripping knife A is moved in the direction of the arrow to pull off the sheath 5 and the insulator 4 (forming the stripped part B indicated in imaginary lines).

In such a cable P as shown in FIG. 2, since the resistance wire 3 is spirally wound around the core 2, the inner surface of insulator 4 is thus interposed between the ridges of the spirally wound resistance wire 3. As a result, when the cable P is stripped of the insulator 4 and sheath 5, the insulator 4 is forced to move over and across the ridges of resistance wire 3. However, when the insulator 4 does not move or slide smoothly, the resistance wire 3 may be unwound or unravelled as shown in FIG. 4, or may be broken as shown in FIG. 5 resulting in the scraping of the surface of core 2. This is specifically caused by the tight engagement between the conductor 3 and the insulator 4, and equivalent damage may also occur when stripping other similar type of electrical cables.

SUMMARY OF THE INVENTION

The object of the present invention is therefore to provide an electrical cable stripping method and an electrical cable loosening device which solves these problems.

The present invention has been developed with a view to substantially solving the above described disadvantages and has for its essential object to provide an improved electrical cable stripping method and an improved electrical cable loosening device.

In order to achieve the aforementioned objective, a stripping method for stripping an electrical cable having a conductor wire wound around a core member and a coating member tightly mounted on the conductor wire, comprises the steps of clamping the electrical cable at a clamping position which is adjacent an end portion of the electrical cable, pounding and bending the end portion to separate the coating member from the conductor wire, and stripping the electrical cable of the coating member at the pounded end portion.

BRIEF DESCRIPTION OF THE DRAWINGS

These and other objects and features of the present invention will become clear from the following description taken in conjunction with the preferred embodiment thereof with reference to the accompanying drawings throughout which like parts are designated by like reference numerals, and in which.

DETAILED DESCRIPTION OF THE PREFERRED EMBODIMENTS

Figure 1:
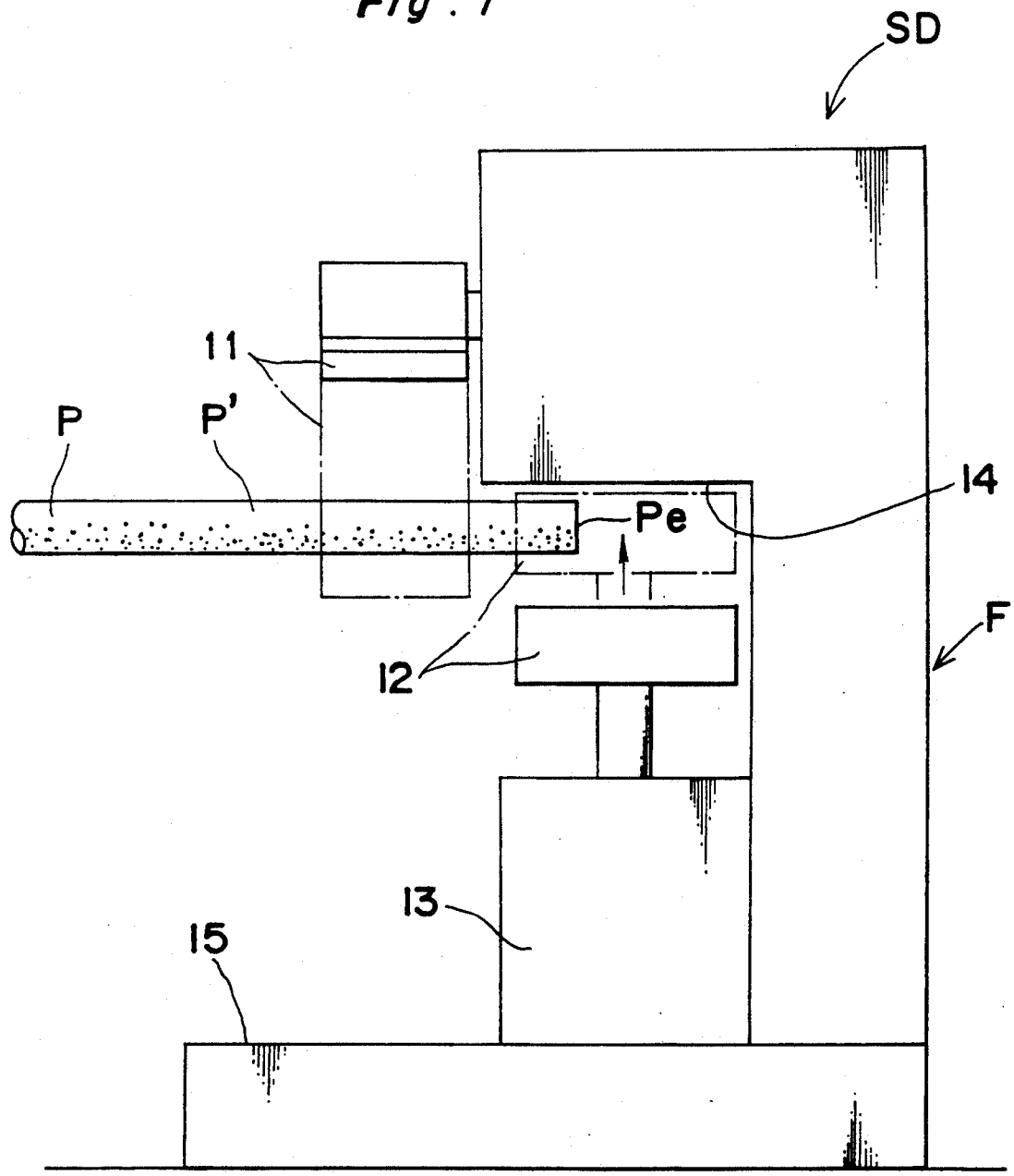
FIG. 1 is a schematic side view of an electrical cable loosening device according to a preferred embodiment of the invention.
Figure 2:
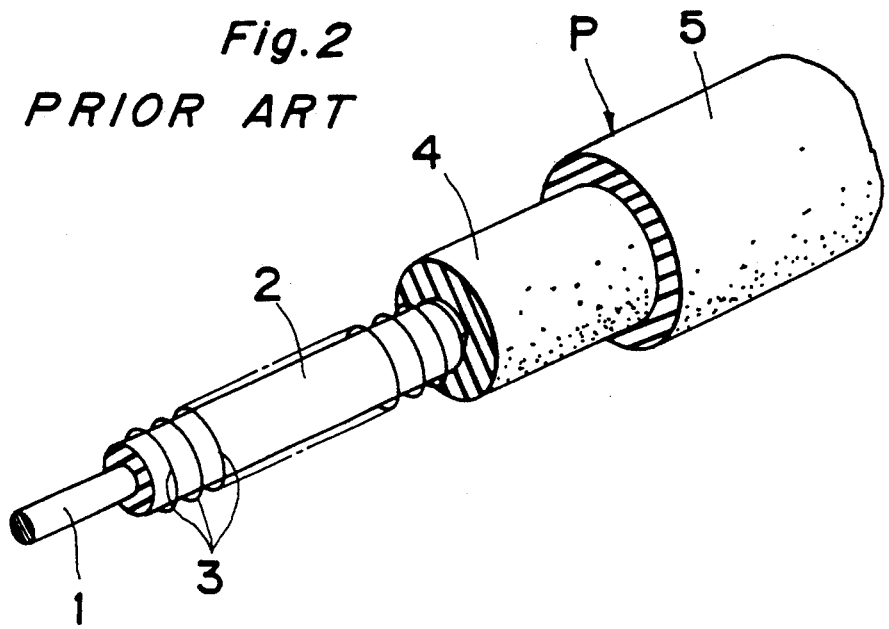
FIG. 2 is a cut-away view of part of a wrapped cable.
Figure 3:
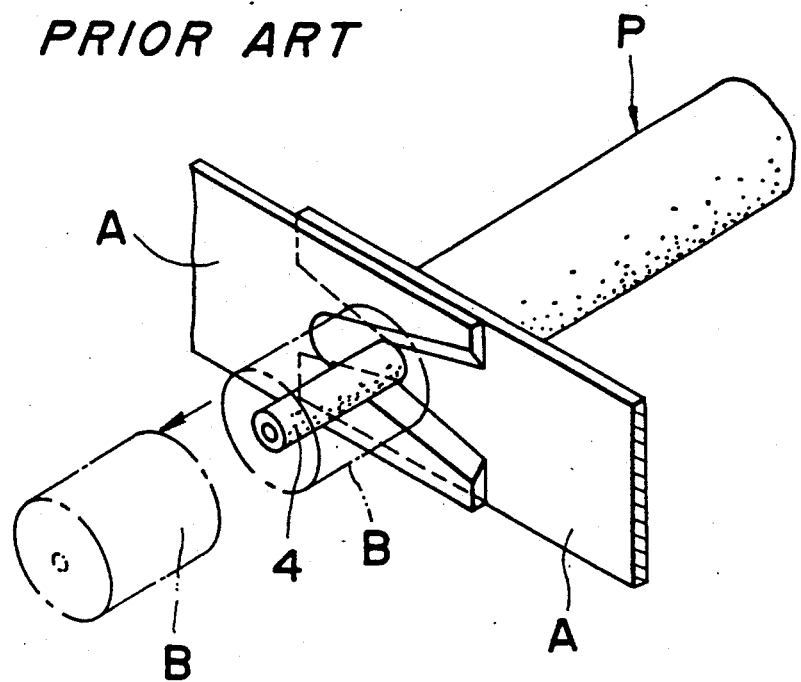
FIGS. 3, 4, and 5 are schematic views for illustrating the stripping operation of the coating member at the cable end portion.
Figure 4:
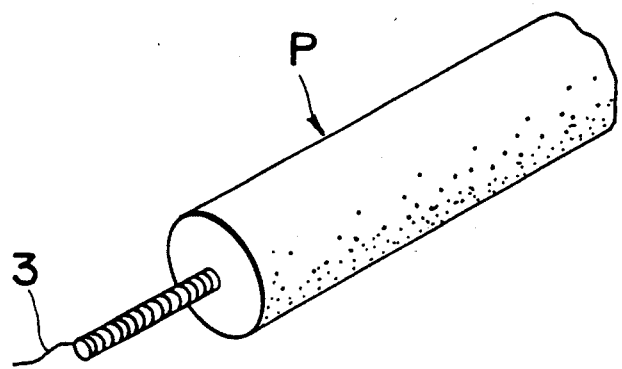
Figure 5:
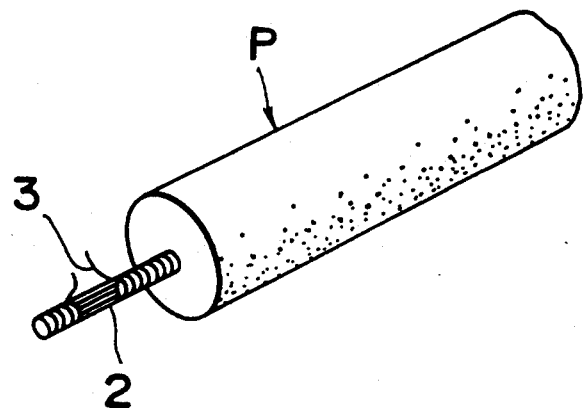

Referring to FIG. 1, an electrical cable loosening device SD according to a preferred embodiment of the present invention is shown in which an electrical cable P is inserted. The stripping device SD has a generally C-shaped frame F including a horizontal base 15 and a generally inverted-L-shaped vertical stand. The stripping device further includes a clamp unit 11 provided at the front end of the vertical stand of frame F for clamping the cable P, a stop unit 14 provided on a lower surface of the vertical stand of frame F, a cylinder unit 13 provided on the horizontal base 15 of frame F adjacent the vertical stand of frame F, and a pressure unit (dog) 12 connected to the cylinder 13 for making reciprocating movement to press the inserted cable P against the step unit 14, repeatedly. In the frame F, the lower surface of the stop unit 14 of the vertical stand is facing and substantially parallel to the surface of the horizontal base 15.

In operation, cable P which is held by clamp 11 is brought to a pounding station at which the end portion Pe of cable P is located between the stop unit 14 and pressure unit 12.

At the pounding station, the pressure unit 12 reciprocates by the cylinder 13 between the positions indicated by a solid line and a dot-dash line, as shown in FIG. 1, to pound and bend the cable end portion Pe. Thus, the insulator 4 separates from the resistance wire 3, so that the resistance wire 3 is loosened. The number of times that the pressure unit 12 strikes or pounds the cable end portion Pe is empirically determined. Thus, at a stripping station which is next to the pounding station, the insulation coating such as the insulator 4 and sheath 5 can be removed smoothly.

A detailed description of the stripping station, as well as the clamping arrangement, is disclosed in U.S. patent application Ser. No. 07/799,256 by Suminori Ishikawa and Shigeharu Suzuki filed Nov. 27, 1991 and entitled and assigned to the same assignee as the present application.

According to the present invention, since the cable is stripped after loosening the end portion thereof as thus described, the unravelling and the damage to the conductor and core can be reduced. Thus, the yield of stripped cable is improved.

Although the present invention has been fully described in connection with the preferred embodiments thereof with reference to the accompanying drawings, it is to be noted that various changes and modifications are apparent to those skilled in the art. Such changes and modifications are to be understood as included within the scope of the present invention as defined by the appended claims unless they depart therefrom.

What is claimed is:

1. A stripping method for stripping an electrical cable having a conductor wire wound around a core member and a coating member tightly mounted on said conductor wire, said method comprising the steps of:

clamping said electrical cable at a clamping position which is adjacent an end portion of said electrical cable;

pounding and bending said end portion to separate said coating member from said conductor wire; and stripping said electrical cable of said coating member at the pounded end portion.

2. An electrical cable loosening device in combination with an electrical cable and for loosening said electrical cable, said electrical cable having a conductor wire wound around a core member and a coating member tightly mounted on said conductor wire, said electrical cable loosening device comprising:

a frame structure;

a stop surface formed on said frame structure;

a clamping means for clamping said electrical cable at a clamping position which is adjacent an end portion of said electrical cable; and a pounding means provided on said frame structure and in association with said stop surface, for repeatedly pounding and bending said end portion of said electrical cable including said coating member against said stop surface to attendantly loosen and separate said coating member form said conductor wire.

* * * * *